United States Patent
Huang

(10) Patent No.: US 12,325,001 B2
(45) Date of Patent: Jun. 10, 2025

(54) REINFORCED TOP COVER STRUCTURE FOR A CHEMICAL FILTER

(71) Applicant: ZI YI ELECTRICAL ENGINEERING CO., LTD., Taichung (TW)

(72) Inventor: Ting-Tsai Huang, Taichung (TW)

(73) Assignee: ZI YI ELECTRICAL ENGINEERING CO., LTD., Taichung (TW)

( * ) Notice: Subject to any disclaimer, the term of this patent is extended or adjusted under 35 U.S.C. 154(b) by 482 days.

(21) Appl. No.: 17/966,068

(22) Filed: Oct. 14, 2022

(65) Prior Publication Data

US 2024/0123381 A1    Apr. 18, 2024

(51) Int. Cl.
*B01D 35/30* (2006.01)

(52) U.S. Cl.
CPC ...... *B01D 35/308* (2013.01); *B01D 2201/305* (2013.01); *B01D 2201/31* (2013.01)

(58) Field of Classification Search
CPC ...... B01D 29/52; B01D 35/30; B01D 35/308; B01D 2201/0438; B01D 2201/301; B01D 2201/34; B01D 29/96; B01D 29/15; B01D 2201/291; B01D 29/114; B01D 2201/0446; B01D 2201/298; B01D 2201/305; B01D 2201/40; B01D 46/2407; B01D 2201/043–0453; B01D 2201/4046; B01D 2201/4053; B01D 2201/31

See application file for complete search history.

(56) References Cited

U.S. PATENT DOCUMENTS

| | | | | |
|---|---|---|---|---|
| 4,248,714 A * | 2/1981 | Acosta | ............... | B01D 29/52 210/450 |
| 5,085,771 A * | 2/1992 | Huang | ............... | B01D 29/52 210/512.3 |

FOREIGN PATENT DOCUMENTS

TW          M598725         7/2020

* cited by examiner

*Primary Examiner* — Pranav N Patel
(74) *Attorney, Agent, or Firm* — Burris Law, PLLC

(57) ABSTRACT

A reinforced top cover structure for a chemical filter includes a cover member made of injection molded plastic material and covering a metal-made core board mounted with multiple positioning pillars. Each positioning pillar has an upper section extending upwardly from a top surface of the core board, a middle section connected to the upper section and extending through a corresponding one of multiple positioning holes in the core board, and a lower positioning part connected to the middle section and extending downwardly from the bottom surface of the core board. The core board has an annular peripheral surface formed with multiple notches. The cover member has an outer peripheral surface surrounding the annular peripheral surface of the core board and formed with multiple engaging grooves that correspond respectively to the notches in position.

7 Claims, 5 Drawing Sheets

REINFORCED TOP COVER STRUCTURE FOR A CHEMICAL FILTER

FIELD

The disclosure relates to a chemical filter, and more particularly to a reinforced top cover structure for a chemical filter.

BACKGROUND

Barrel top covers of conventional chemical filters are mostly plastic injection molded using one or more metal molds, or are formed through a CNC (Computer Numerical Control) plastic machining process. The injection-type barrel top cover must have a certain thickness and be reinforced with a plurality of reinforcing ribs that can resist increased internal pressure in the barrel to reduce deformation, which thereby prevents the bursting of the barrel due to severe deformation. The CNC plastic machining-type barrel top cover relies on its own thickness or an added metal plate, which is mounted externally onto the top of the CNC machining-type barrel top cover and is fastened by plastic engaging locks (the metal plate does not contact the barrel or chemical liquid therein) to resist deformation from the high pressure within the barrel.

A conventional chemical filter disclosed in Taiwan Utility Model Patent Certificate No. M598725 includes a body, a filter mounted in the body, a top cover openably covering the top of the body, and a plurality of fastening units pivoted to an outer periphery of the body and abutting against the top cover. When the conventional chemical filter is assembled, the fastening units are used to fasten the top cover to the body.

Although, the above chemical filter can achieve its intended purpose, because the top cover is made of only one layer of plastic material, the top cover may be easily deformed and damaged by the high pressure required to filter chemical waste liquid.

SUMMARY

Therefore, an object of the disclosure is to provide a reinforced top cover structure for a chemical filter that can alleviate at least one of the drawbacks of the prior art.

According to the disclosure, the reinforced top cover structure includes a core board, a plurality of positioning pillars, and a cover member.

The core board is made of a metal material, and has a bottom surface, a top surface opposite to the bottom surface, an annular peripheral surface extending between the bottom surface and the top surface, a plurality of positioning holes extending from the bottom surface to the top surface, and a plurality of notches spaced apart from each other and extending inwardly from the annular peripheral surface.

Each positioning pillar is positioned on/in the core board, and has a middle section that extends through a corresponding one of the positioning holes, a lower positioning part that is connected to the middle section and extends downwardly from the bottom surface of the core board, and an upper section that is connected to the middle section and extends upwardly from the top surface of the core board.

The cover member is made of an injection molded plastic material, covers the core board, and has an outer peripheral surface that surrounds the annular peripheral surface of the core board, and a plurality of engaging grooves that are formed in the outer peripheral surface and that correspond respectively to the notches in position.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Figure 1:
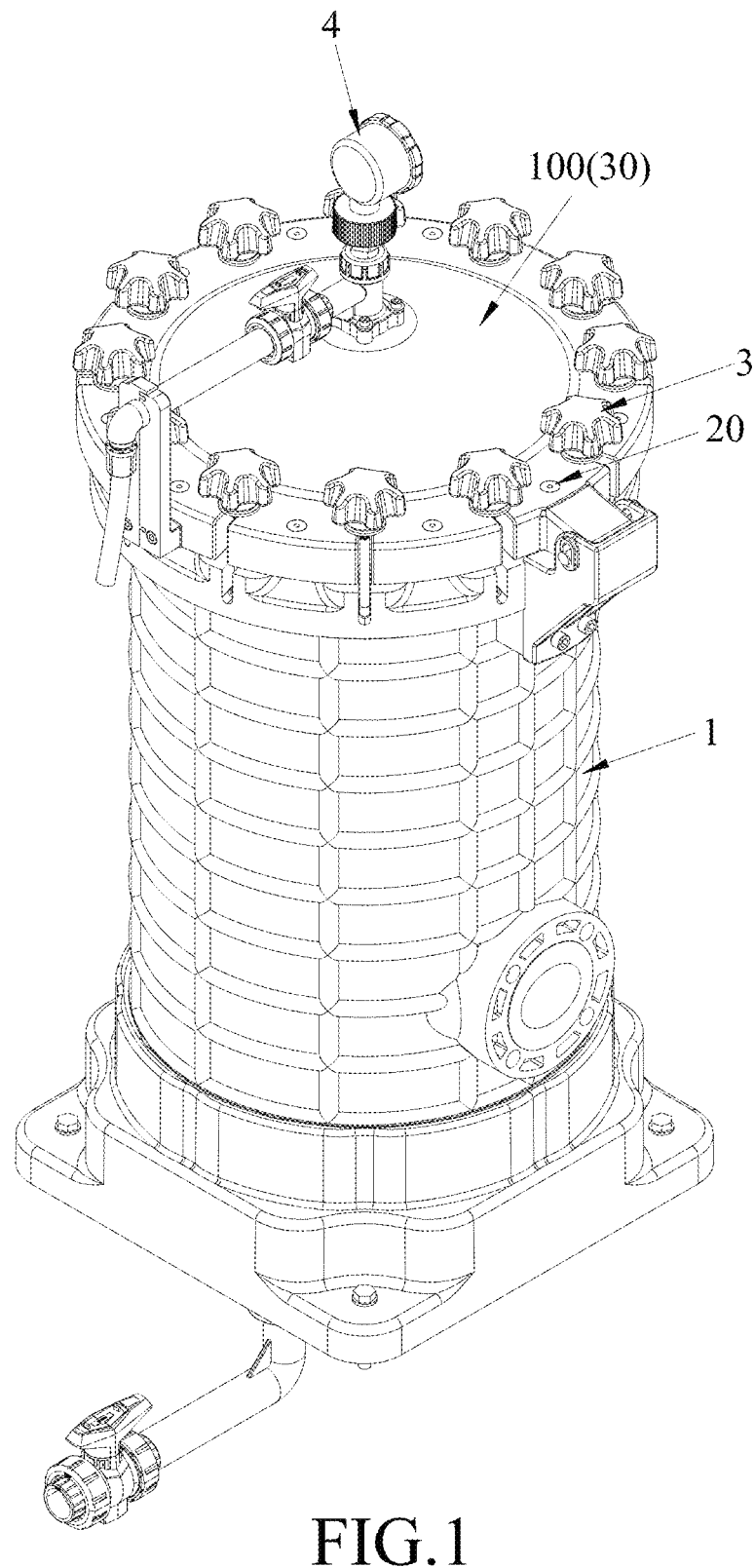
FIG. 1 is a perspective view of a chemical filter assembled with the embodiment of a reinforced top cover structure according to the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Figure 2:
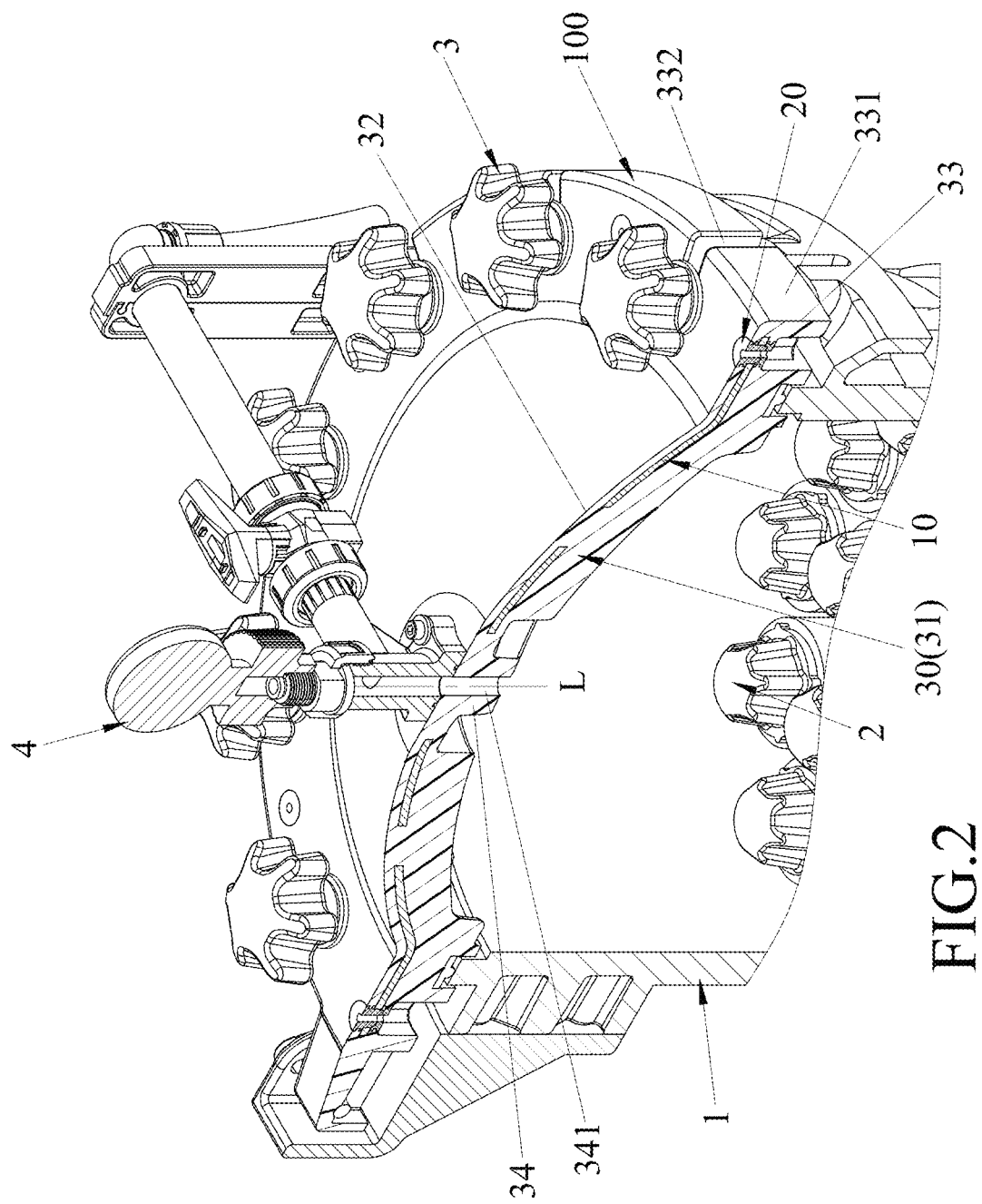
FIG. 2 is a partly sectional, fragmentary perspective view of the chemical filter.

Referring to FIG. 1 and FIG. 2, the embodiment of a reinforced top cover structure 100 for a chemical filter of the disclosure is shown. The chemical filter includes a filter barrel unit 1, a filter unit 2 mounted in the filter barrel unit 1, and a plurality of fastening units 3 pivotally connected to the filter barrel unit 1 and operable to press against the reinforced top cover structure 100 (see FIG. 1). The reinforced top cover structure 100 operably covers the top of the filter barrel unit 1, and includes a core board 10, a plurality of positioning pillars 20 and a cover member 30.

Figure 3:
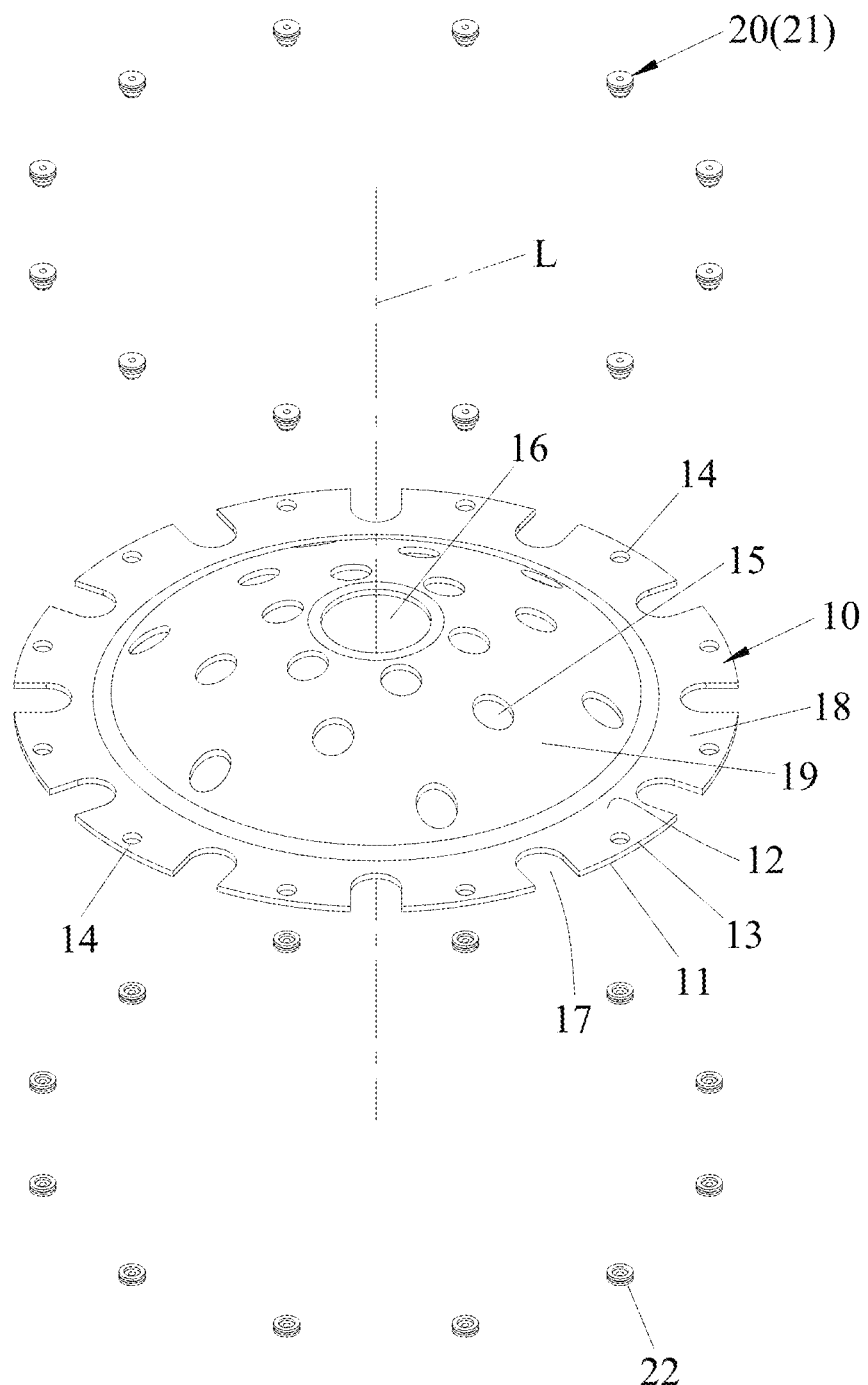
FIG. 3 is an exploded perspective view of a core board and a plurality of positioning pillars of the embodiment.

Referring to FIG. 3, the core board 10 is made of a metal material, is formed using a metal-stamping die, and has a bottom surface 11, a top surface 12 opposite to the bottom surface 11, an annular peripheral surface 13 extending between the bottom surface 11 and the top surface 12, a plurality of positioning holes 14 extending from the bottom surface 11 to the top surface 12, a plurality of through holes 15 extending from the bottom surface 11 to the top surface 12, a central hole 16 aligned with an axis (L) and extending from the bottom surface 11 to the top surface 12, and a plurality of U-shaped notches 17 spaced apart from each other and extending inwardly from the annular peripheral surface 13. The positioning holes 14 are proximate to the annular peripheral surface 13 and are spaced apart from the notches 17. The through holes 15 are arranged between the central hole 16 and the positioning holes 14. In this embodiment, the core board 10 is in the form of an inverted dish, and includes an arcuate central portion 19 projecting upwardly and having the through holes 15 and the central hole 16, and an annular rim portion 18 connected to the arcuate central portion 19 and having the positioning holes 14, the notches 17 and the annular peripheral surface 13.

Figure 5:
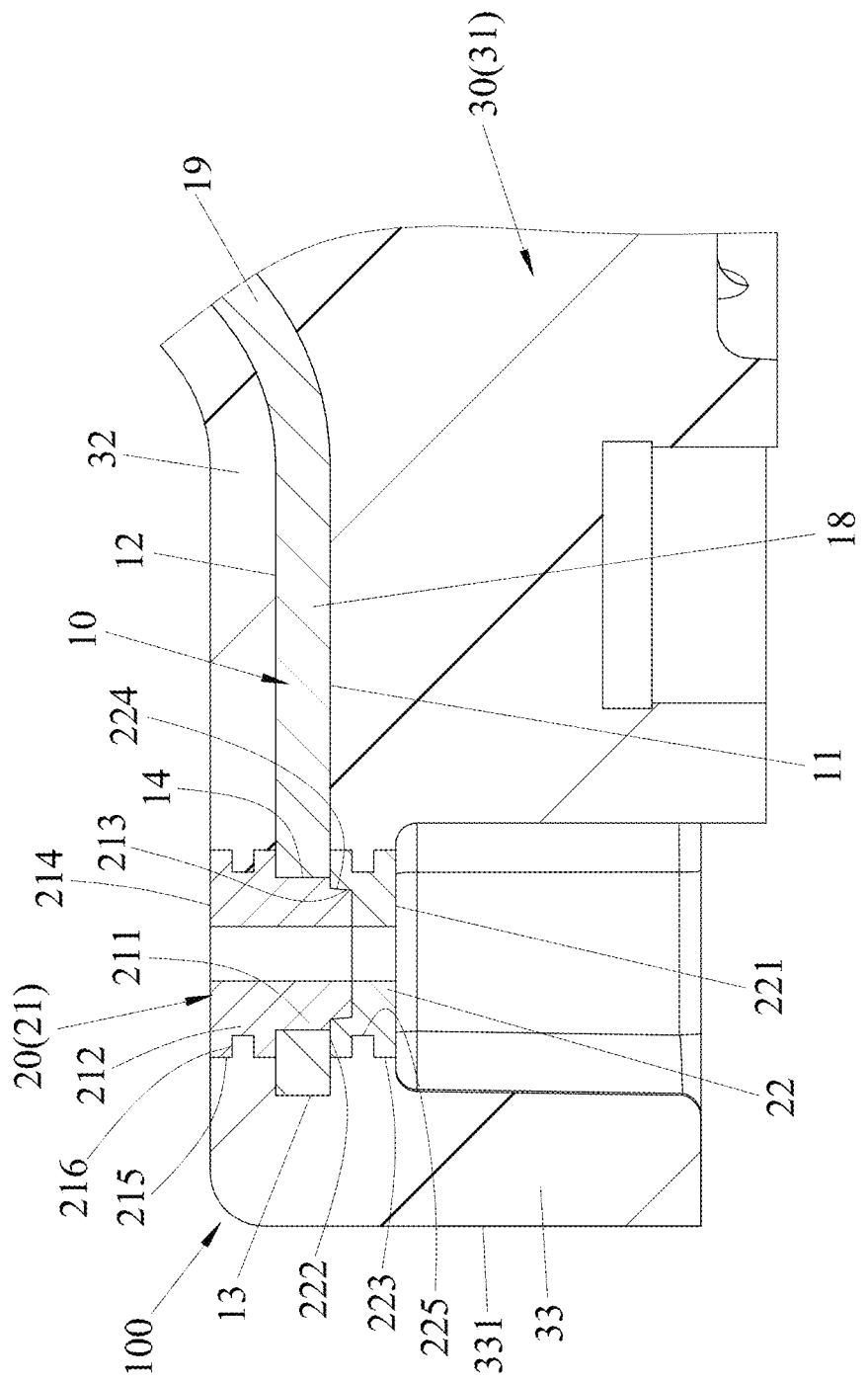
FIG. 5 is an enlarged view of a portion of FIG. 4.

Referring further to FIG. 5, each positioning pillar 20 is positioned on/in the core board 10, and has an upper positioning part 21 and a lower positioning part 22. The upper positioning part 21 of each positioning pillar 20 is mounted to the top surface 12 of the core board 10, and has a middle section 211 extending through a corresponding one of the positioning holes 14 in the core board 10, and an upper section 212 connected integrally to the middle section 211 and extending upwardly from the top surface 12 of the core board 10. The middle section 211 is in the shape of a stepped cylinder, and has a thinner sleeve portion 213 adjacent to and protruding outwardly from the bottom surface 11 of the core board 10. The upper section 212 is thicker than the middle section 211, and has a top end surface 214, an outer annular surface 215 extending downwardly from the top end surface 214, and an outer annular groove 216 formed in the outer annular surface 215. The lower positioning part 22 is mounted to the bottom surface 11 of the core board 10, and is thicker than and detachably connected to the middle section 211. The lower positioning part 22 extends downwardly from the bottom surface 11 of the core board 10, and has a bottom end surface 221, an abutting surface 222 opposite to the bottom end surface 221, an outer annular surface 223 extending between the bottom end surface 221 and the abutting surface 222, an engaging portion 224 formed in the abutting surface 222 as a concave portion and releasably engaging the sleeve portion 213, and an outer annular groove 225 formed in the outer annular surface 223.

Figure 4:
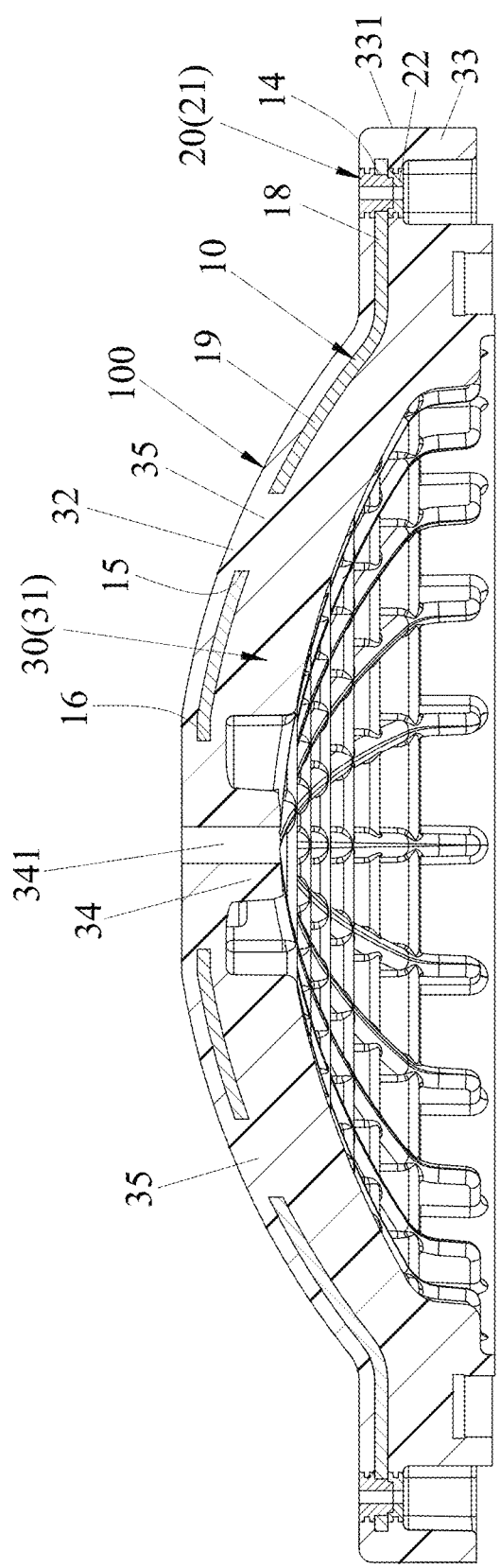
FIG. 4 is a side view of the embodiment.

Referring further to FIG. 4, the cover member 30 may be made of a plastic material selected from polypropylene (PP), polypropylene homopolymer (PPH), polyvinylidene fluouride (PVDF), hard polyvinyl chloride (UPVC), chlorinated polyvinyl chloride (CPUC), etc., and is injection molded to directly cover the core board 10 assembled with the positioning pillars 20 that is disposed in a mold. The cover member 30 includes a lower side wall 31 disposed on the bottom surface 11 of the core board 10, an upper side wall 32 disposed on the top surface 12 of the core board 10, an outer annular wall 33 integrally connected to the lower side wall 31 and the upper side wall 32 and surrounding the annular peripheral surface 13 of the core board 10, a shaft tube portion 34 extending through the central hole 16 in the core board 10, and a plurality of connecting portions 35 extending respectively through the through holes 15 in the core board 10. The lower side wall 31, the upper side wall 32, the outer annular wall 33, the shaft tube portion 34 and the connecting portions 35 are integrally connected to form one piece. The outer annular wall 33 has an outer peripheral surface 331, and a plurality of engaging grooves 332 formed in the outer peripheral surface 331 and corresponding respectively to the notches 17 in position. The shaft tube portion 34 has an inner hole 341 for mounting a pressure gauge 4.

Before the cover member 30 of the reinforced top cover structure 100 is molded, the positioning pillars 20 must be pre-assembled to the core board 10. More specifically, referring again to FIG. 5, for each positioning pillar 20, the upper positioning part 21 is inserted into the corresponding one of the positioning holes 14 in the core board 10 until the bottom of the upper section 212 abuts against the top surface 12 of the core board 10, and then the lower positioning part 22 is mounted to the bottom surface 11 of the core board 10 until the abutting surface 222 of the lower positioning part 22 abuts against the bottom surface 11 while the engaging portion 224 of the lower positioning part 22 is engaged with the sleeve portion 213 of the middle section 211. As such, all the positioning pillars 20 are thus mounted to the core board 10.

Referring again to FIGS. 2, 4 and 5, during the injection molding process of the cover member 30, since the positioning pillars 20 are embedded into and positioned in the core board 10, the top end surface 214 and the bottom end surface 221 of each positioning pillar 20 may abut against an inner surface of a mold (not shown) and be positioned in an injection molding cavity in the mold, thereby enhancing the positioning effect of the core board 10 in the injection molding process. That is, the positioning pillars 20 are pre-embedded and positioned in the core board 10, so that the core board 10 can act as a metal interlayer and be completely stably fixed in plastic material to form the cover member 30 (sandwich structure), thereby avoiding unstableness. For example, the metal interlayer shifting under the impact of high pressure extrusion during the injection molding.

After the reinforced top cover structure 100 is made, the contour of the annular peripheral surface 13 of the core board 10 does not exceed the contour of the outer peripheral surface 331 of the cover member 30. The core board 10 is completely covered by the cover member 30. The bottom end surface 221 of the lower positioning part 22 of each positioning pillar 20 does not protrude out of the lower side wall 31, and the top end surface 214 of the upper section 212 of each positioning pillar 20 does not protrude out of the upper side wall 32. Since the injection molded plastic material forming the cover member 30 is extruded into the outer annular grooves 225, 216 in each positioning pillar 20, an anchoring effect between the cover member 30 and the positioning pillars 20 can be increased. In addition, the injection molded plastic material forming the cover member 30 is extruded into the through holes 15 to serve as the connecting portions 35. The lower side wall 31, the upper side wall 32, the outer annular wall 33, the shaft tube portion 34 and the connecting portions 35 are made of injection molded plastic material forming the cover member 30 and are integrally connected to form one piece, such that a firm joint between the core board 10 and the cover member 30 can be established.

Therefore, in the injection process of the cover member 30, by using the metal-made core board 10 and the positioning pillars 20, a laminated structure constituted by the cover member 30 and the core board 10 can be obtained, and the overall structural strength of the reinforced top cover structure 100 can be enhanced, so that the positioning effect of the core board 10 in the injection process may be increased and the quality of the reinforced top cover structure (100) can be enhanced.

It is worth to mention herein that each positioning pillar 20 of the above embodiment of the disclosure has the upper positioning part 21, and a lower positioning part 22 that is detachable from the upper positioning part 21. However, in other embodiments, each positioning pillar 20 may be manufactured as one piece (not shown) if the positioning pillars 20 are fastened to the core board 10 via pressing.

Furthermore, since the reinforced top cover structure 100 of the disclosure cooperates with the fastening units 3 to provide a locking mechanism and since the core board 10 as the metal interlayer is rigid enough to resist internal pressure in the filter barrel unit 1 without deforming, the reinforced top cover structure 100 can be prevented from cracking due to inflation and deformation from the inner pressure in the filter barrel unit 1, and this can indeed solve the problem of bursting which occurs with regularity in existing top covers formed by plastic injection molding or through the CNC plastic machining process.

In summary, the entire reinforced top cover structure 100 of the present disclosure is simple, and can be easily manufactured and assembled. The object of the disclosure can indeed be achieved.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A reinforced top cover structure for a chemical filter, comprising:
   a core board made of a metal material, and having a bottom surface, a top surface opposite to said bottom surface, an annular peripheral surface extending between said bottom surface and said top surface, a plurality of positioning holes extending from said bottom surface to said top surface, and a plurality of notches spaced apart from each other and extending inwardly from said annular peripheral surface;
   a plurality of positioning pillars each positioned on/in the core board, and having a middle section that extends through a corresponding one of said positioning holes, a lower positioning part that is connected to said middle section and extends downwardly from said bottom surface of said core board, and an upper section that is connected to the middle section and extends upwardly from said top surface of said core board; and
   a cover member made of injection molded plastic material, covering said core board, and having an outer peripheral surface that surrounds said annular peripheral surface of said core board, and a plurality of engaging grooves that are formed in said outer peripheral surface and that correspond respectively to said notches in position.

2. The reinforced top cover structure of claim 1, wherein said lower positioning part of each of said positioning pillars has a bottom end surface, said upper section having a top end surface, said core board being completely covered by said cover member, said cover member including a lower side wall that is disposed on said bottom surface of said core board, an upper side wall that is disposed on said top surface, and an outer annular wall that is connected integrally to said lower side wall and said upper side wall, that surrounds said annular peripheral surface of said core board and that has said outer peripheral surface, said bottom end surface of said lower positioning part of each of said positioning pillars not protruding out of said lower side wall, said top end surface of said upper section of each of said positioning pillars not protruding out of said upper side wall.

3. The reinforced top cover structure of claim 2, wherein said middle section and said upper section of each of said positioning pillars are connected integrally to each other and cooperatively constitute an upper positioning part, said middle section of each of said positioning pillars having a sleeve portion adjacent to said bottom surface of said core board, said lower positioning part being thicker than said middle section and having an engaging portion that is releasably engaged with said sleeve portion, and an outer annular groove, said upper section being thicker than said middle section and having an outer annular groove, said outer annular grooves of said lower positioning part and said upper section permitting injection molded plastic material for forming said cover member to be extruded thereinto.

4. The reinforced top cover structure of claim 3, wherein said sleeve portion of said upper positioning part of each of said positioning pillars protrudes outwardly from said bottom surface of said core board, said lower positioning part further having an abutting surface opposite to said bottom end surface, and an outer annular surface extending between said bottom end surface and said abutting surface, said engaging portion being a concave portion formed in said abutting surface, said outer annular groove being formed in said outer annular surface.

5. The reinforced top cover structure of claim 2, wherein said core board further has a plurality of through holes extending from said bottom surface to said top surface, said cover member further including a plurality of connecting portions that extend respectively through said through holes and are integrally connected to said lower side wall and said upper side wall.

6. The reinforced top cover structure of claim 5, wherein said core board further has a central hole extending from said bottom surface to said top surface, said cover member further including a shaft tube portion that extends through said central hole and has an inner hole.

7. The reinforced top cover structure of claim 6, wherein said core board is in the form of an inverted dish, and includes an arcuate central portion projecting upwardly and having said through holes and said central hole, and an annular rim portion connected to said arcuate central portion and having said positioning holes, said notches and said annular peripheral surface.

\* \* \* \* \*